Dec. 11, 1956  A. J. PRITCHARD  2,773,697
STEERING IDLER SUPPORT
Filed Dec. 21, 1953
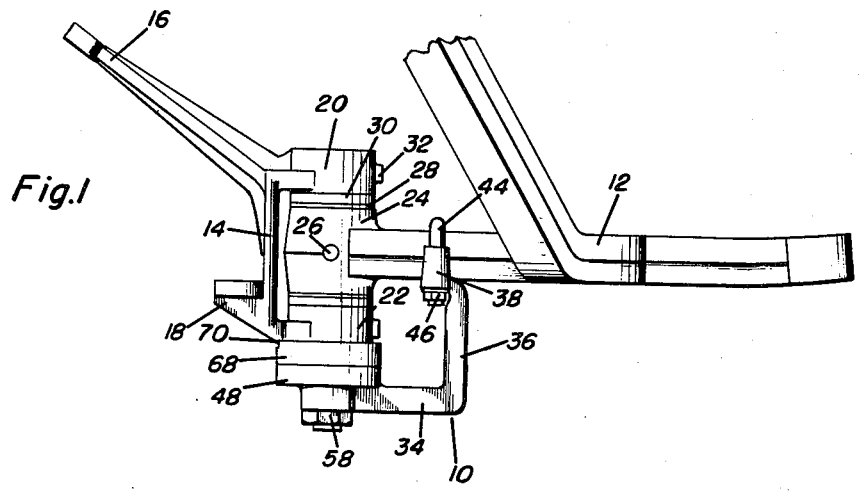
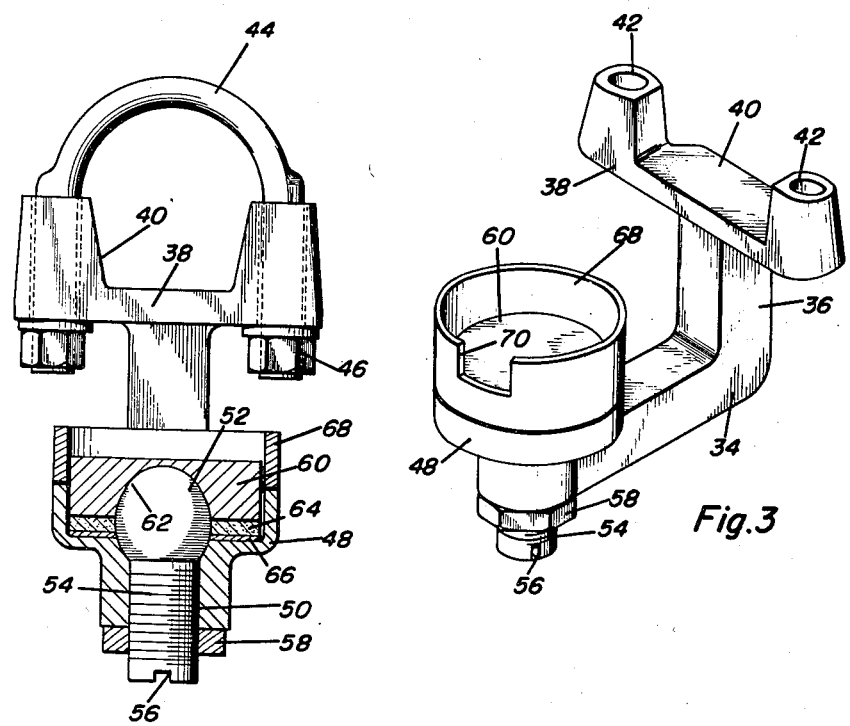
Arnold J. Pritchard
INVENTOR.

United States Patent Office 2,773,697
Patented Dec. 11, 1956

2,773,697

STEERING IDLER SUPPORT

Arnold J. Pritchard, Carnegie, Okla.

Application December 21, 1953, Serial No. 399,473

4 Claims. (Cl. 280—95)

This invention relates to a steering idler support and more specifically provides an attachment for interconnecting the idler and third arm to the idler arm bracket and is specifically designed for utilization in the lower and medium priced automobiles.

An object of this invention is to provide a steering idler support which interconnects the idler arm and the idler arm bracket for retaining the idler arm in correct relation to the idler arm bracket thereby preventing the usual tilting and canting of the idler arm after some use.

A further object of this invention is to provide a steering idler support which may be easily and quickly attached to existing idler arms and idler arm brackets for efficiently and effectively retaining the idler arm bracket and the idler arm in correct relation.

In certain makes of present day automobiles there is provided a steering mechanism wherein a bracket supports a combination idler arm and third arm member for rotation through the medium of a pivot shaft. The pivot shaft is securely attached to the idler arm and rotates within the tubular legs of a bifurcated bracket. Shims are provided between the legs of the bifurcated bracket and the arm in order to hold the shaft against reciprocable movement on its axis of rotation. It is almost impossible to entirely take up the looseness in the shaft by use of such shims and accordingly, this looseness is felt by the driver of the automobile in the steering wheel and is objectionable as the driver does not retain accurate and positive control of the vehicle. Therefore, it is an important object of this invention to provide an attachment for taking up the looseness between the idler arm and the idler arm bracket and preventing relative tilting, canting or movement therebetween.

Yet a still further object of this invention is to provide a steering idler support which is simple and rugged in construction, easy to install and adjust, effective in operation and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view showing the steering idler support of this invention attached to the idler arm and engaging the idler arm bracket;

Figure 2 is a vertical section taken substantially along the center line of the idler arm engaging socket; and Figure 3 is a perspective view of the steering idler support pocket of the present invention.

Referring now specifically to Figure 1 of the drawings, it will be seen that the numeral 10 designates the steering idler support of this invention for connection between a steering idler arm 12 and an idler arm bracket 14 having an upper supporting arm 16 and a lower supporting arm 18. It will be noted that the upper arm 16 is much longer than the lower arm 18 which is conventional structure in modern automobiles. The idler arm bracket 14 is provided with a bifurcated portion forming upper and lower tubular legs 20 and 22. The idler arm 12 is provided with a tubular member 24 for alignment with the tubular members 22 and 20. A pivot shaft is provided through the tubular members 20, 22 and 24 and is rigidly attached to the tubular member 24 by a transverse pin 26. Suitable shims 28 and seals 30 are provided on each side of the tubular member 24 on the idler arm for lubrication and taking up the "play" which results from the wear of the bracket arm 12 pivoting in relation to the idler arm bracket 14. With the exception of the support 10 this structure is conventional in present day automobiles. Obviously, suitable grease receiving openings 32 may be provided on the tubular members 20 and 22 as in the present practice of lubrication.

Referring now specifically to Figures 2 and 3, it will be seen that the support 10 of this invention includes a right angular member having a horizontal arm 34 and a vertical arm 36. The vertical arm 36 terminates in a transverse bar 38 having a centrally disposed recess portion 40 on its upper surface and apertures 42 at opposite ends formed in the bosses on each side of the relieved portion 40. A U-shaped bolt 44 is provided for surrounding the idler arm 12 and positioning through the apertures 42. Fastening nuts 46 are provided for engaging the bolt 44 for rigidly securing the support 10 to the idler arm 12. It will be understood that a recessed portion 40 closely receives the idler arm 12 thereby precluding any relative motion between the idler arm 12 and the steering idler support 10.

The horizontal arm 34 terminates in an upwardly opening socket member having an internally threaded bore 50 through the bottom thereof and through the end of the horizontal arm 34. A ball-shaped member 52 having an integral externally threaded stud 54 projecting therefrom is positioned in the socket 48 with the threaded stud 54 in engagement with the internally threaded bore 50. The end of the stud 54 is provided with a transverse slot 56 and a lock nut 58 is provided on the stud 54 for engaging the undersurface of the arm 34 for locking the stud 54 in adjusted relation to the arm 34. A saddle member 60 having a generally semi-circular recess 62 in the undersurface thereof is positioned on the ball member 52 and is held thereon by the socket member 48. It will be understood that the socket member 48 extends vertically above the lower edge of the saddle 60 thereby preventing lateral displacement of the saddle 60. A suitable cork seal 64 and a seal retainer 66 is provided between the bottom of the saddle 60 and the socket 48 for lubricating and sealing the ball member 52. An annular sleeve 68 having the same diameter as the socket member 48 is positioned thereon and surrounds the upper periphery of the saddle member 60 thereby retaining the saddle member 60, the socket 48 and the annular ring 68 in alignment. A recessed portion 70 is provided in the upper edge of the annular ring 68 for straddling and receiving the short or lower arm 18 of the idler arm bracket 14.

The support 10 is secured to the idler arm by utilization of the U-bolt 44 in an obvious manner. The transverse bar 38 is positioned on the arm 12 in such a manner that the socket 48 is in alignment with the undersurface of the lower tubular member 22. This may be accomplished by positioning a tubular sleeve or ring 68 on the tubular member 22 with the tubular member 68 resting against the upper surface of the socket 48 in an obvious manner. When this is accomplished, the lock nut 58 may be loosened by a suitable tool such as an enlarged screw driver, the ball member 52 may be elevated thereby elevating the saddle member 60 and drawing the lower surface of the tubular member 24 on the idler arm 12 toward the upper surface of the lower tubular member 22 on the idler arm bracket 14. This prevents the usual tilting and canting between the bracket 14 and the arm 12 and will prevent any relative movement between these members except about a pivot axis coincident with the pivot shaft (not shown). In practical installation, when the clearance between the tubular members 24 and 22 exceeds .006 inch a shim must be installed between these members. After use, it becomes exceedingly difficult to properly "shim up" the bracket 14 and the arm 12 so that the driver may have instant control without excessive "play." The support of this invention securely holds the idler arm 12 against the tubular member 22 thereby preventing any looseness to be transmitted to the steering wheel of the automobile. In the embodiment as specifically shown, a ball member and saddle is employed. However, it is within the purview of this invention to include a thrust bearing or the like on a vertically adjustable stud in place of the ball and saddle arrangement as shown. Obviously, the various components of this invention may be constructed of readily obtainable materials having the necessary strength qualities to satisfy the requirements of a device used in the steering linkage of an automobile. This device may be easily attached by a skilled mechanic and will eliminate the necessity of the constant shimming and bushing wear and consequent replacement.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A bracket adapted to interconnect a pivotal steering idler arm and a steering idler arm bracket for urging the arm and arm bracket towards each other, said bracket adapted to be rigidly secured to the idler arm and to engage a major portion of the undersurface of the idler arm bracket below the pivotal connection between the idler arm and idler arm bracket thereby preventing canting of the idler arm in relation to the idler arm bracket, said bracket including a rotatable saddle engaging the arm bracket, and means for adjusting the force of contact between the saddle and arm bracket thereby permitting the idler arm to pivot in relation to the idler arm bracket, said means including a ball member engaging the saddle and an integral threaded stud engaging a threaded aperture in the bracket for adjustment of said ball member and saddle in relation to the bracket.

2. The structure as defined in claim 1 wherein a sleeve is provided for aligning the saddle and the lower end of the idler arm bracket.

3. A support adapted to interconnect a steering idler arm and an idler arm bracket pivotally supporting one end of the arm with a pivot shaft forming the pivotal axis therebetween, said support comprising a substantially right angular member having a vertical and a horizontal leg, means at the upper end of the vertical leg for rigid clamping engagement with the idler arm in spaced relation to the pivotal connection between the idler arm and the bracket, and means on the horizontal leg for engagement with the undersurface of the bracket directly under the pivot shaft thereby preventing tilting movement of the idler arm in relation to the idler arm bracket, said means on the horizontal leg including an enlarged socket with an internally threaded bore extending through the bottom of said socket, a ball member having a threaded stud integral therewith and disposed in said bore, a saddle member being positioned in said socket and engaging the undersurface of the bracket, said saddle member having a semi-spherical recess receiving said ball member, and means on the end of said stud for engagement by a tool for adjusting the height of said saddle member thereby adjusting the force of contact between the saddle member and bracket.

4. A support attachment for interconnecting a steering idler arm and an idler arm bracket having a planar lower surface with a generally vertical pivot shaft forming a pivot axis between the arm and bracket, said support attachment comprising a substantially right angular rigid member having a vertical and a horizontal leg, clamp means at the upper end of the vertical leg for rigid attachment to the idler arm in spaced relation to the pivotal connection between the idler arm and idler arm bracket, the horizontal leg having an upstanding flange on the upper surface thereof and forming a generally cup-shaped area, a bearing member disposed in said cup-shaped area and having the upper surface area thereof disposed in substantially a single plane above the upper edge of the flange with the periphery thereof being substantially coextensive with the periphery of the lower surface of the idler arm bracket for engagement therewith, said bearing member having a centrally disposed recessed area, and an upwardly extending projection in the bottom of the cup-shaped area and extending into the recessed area of the bearing member for preventing lateral displacement of the bearing member, the upper surface area of said bearing member adapted to engage the unaltered lower surface of the idler arm for substantially precluding relative pivotal movement between the idler arm and idler arm bracket except about the vertical pivot shaft.

References Cited in the file of this patent

UNITED STATES PATENTS

| | | |
|---|---|---|
| 2,588,544 | Langer | Mar. 11, 1952 |
| 2,620,202 | Coleman | Dec. 2, 1952 |
| 2,684,260 | Hawley | July 20, 1954 |